(12) United States Patent
Morgan (10) Patent No.: US 9,992,224 B1
(45) Date of Patent: Jun. 5, 2018

(54) PASSENGER PRESENCE INDICATION SYSTEM AND METHOD

(71) Applicant: GENERAL MOTORS LLC, Detroit, MI (US)

(72) Inventor: William K. Morgan, Wyandotte, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 0 days. days.

(21) Appl. No.: 15/615,013

(22) Filed: Jun. 6, 2017

(51) Int. Cl.
G06F 3/048 (2013.01)
H04L 29/06 (2006.01)
H04L 29/08 (2006.01)

(52) U.S. Cl.
CPC ........ H04L 63/1475 (2013.01); H04L 67/125 (2013.01); H04L 67/16 (2013.01); *G06F 3/048* (2013.01)

(58) Field of Classification Search
CPC ..... H04L 63/1475; H04L 29/06; H04L 67/16; H04L 29/08; H04L 67/125; G06F 3/048
See application file for complete search history.

(56) References Cited

U.S. PATENT DOCUMENTS 7,496,623 B2   2/2009 Szeto
2017/0126680 A1*  5/2017 Yusuf ................... H04W 12/02

* cited by examiner

*Primary Examiner* — Frantz Bataille (57) ABSTRACT

A system to indicate the presence of one or more bystanders during wireless communications is herein presented. The system includes: a memory, controller, one or more bystander sensors, and a first transceiver device. The memory is configured to include one or more executable instructions. The controller is configured to execute the executable instructions. Each bystander sensor is configured to produce bystander information. The first transceiver device is capable of communicating with the controller. Moreover, the executable instructions enable the controller to: receive bystander information from the one or more bystander sensors; generate indicator information based on the sensor information; permit a first communication link to be established with the first transceiver device; and provide the first transceiver device with the indicator information through the first communication link.

12 Claims, 6 Drawing Sheets

PASSENGER PRESENCE INDICATION SYSTEM AND METHOD

INTRODUCTION

Vehicle operators engaged in two-way wireless voice communications often trade the privacy of their conversations for the convenience and safety of hands-free communications through their vehicle stereo system or independent headset. This raises the risk of the opposing party, for which they are conversing, to make a potentially embarrassing/personal/confidential statement that could be overheard by any vehicle passengers. It is therefore desirable to provide a system and method which can give one party to such communications certain information regarding the presence of any vehicle passengers near the party for which they are conversing.

SUMMARY

A system to indicate the presence of one or more bystanders during wireless communications is herein presented. The system includes: a memory, controller, one or more bystander sensors, and a first transceiver device. The memory is configured to include one or more executable instructions. The controller is configured to execute the executable instructions. Each bystander sensor is configured to produce bystander information. The first transceiver device is capable of communicating with the controller. Moreover, the executable instructions enable the controller to: receive bystander information from the one or more bystander sensors; generate indicator information based on the sensor information; permit a first communication link to be established with the first transceiver device; and provide the first transceiver device with the indicator information through the first communication link.

In one or more embodiments, the executable instructions may further enable the controller to: receive a command to launch the first communication link with the first transceiver device; and launch the first communication link with the first transceiver device. In one or more embodiments, the system may further include one or more second transceiver devices located in proximity to the controller. In such embodiments, the executable instructions further enable the controller to: permit a second communication link to be established with the one or more second transceiver devices; receive general identifier information from the one or more second transceiver devices; generate user information based on the general identifier information; and additionally base the indicator information on the user information.

In one or more embodiments, the system may further include the controller being located in a vehicle telematics unit. In these embodiments, a third transceiver device located in proximity to the vehicle interior. Moreover, the executable instructions further enable the controller to: permit a third communication link to be established with the third transceiver device; and permit a connection to be configured between the first and third communication links such that communications can occur between the first and third transceiver devices. In these embodiments, the executable instructions may further enable the controller to additionally base the indicator information on the third communication link. Furthermore, in these embodiments, a fourth transceiver device may be located in proximity to the third transceiver device. In such instances, moreover, the executable instructions further enable the controller to: permit a fourth communication link to be established between the fourth transceiver device and the third transceiver device; and permit a connection to be configured between the first, third, and fourth communication links such that communications can occur between the first and fourth transceiver devices. In addition, the executable instructions may further enable the controller to additionally base the indicator information on the fourth communication link. The bystander sensors may also located within the vehicle interior, the bystander sensors are configured to generate vehicle passenger information.

In a communication system capable of wireless communications between a controller and one or more transceiver devices, a method to indicate the presence of one or more vehicle passengers during wireless communications is also presented herein. The method includes the steps of: receiving (via the controller) vehicle passenger information from one or more vehicle sensors located within a vehicle interior; permitting (via the controller) a first communication link to be established with a first transceiver device; permitting (via the controller) a second communication link to be established with one or more second transceiver devices located in proximity to the vehicle interior; receiving (via the controller) general identifier information from the one or more second transceiver devices; generating (via the controller) user information based on the general identifier; generating (via the controller) indicator information based on the vehicle passenger information and user information; and providing (via the controller) the first transceiver device with the indicator information through the first communication link.

In one or more embodiments the method further includes the step of receiving (via the controller) a command to launch the first communication link with a first transceiver device; and launching (via the controller) the first communication link with the first transceiver device. In one or more embodiments, the method further includes the step of permitting (via the controller) a third communication link to be established with a third transceiver device located in proximity to the vehicle interior; and permitting (via the controller) a connection to be configured between the first and third communication links such that communications can occur between the first and third transceiver devices. In these embodiments, the method may further include the step of additionally basing (via the controller) the indicator information on the third communication link. In these embodiments, the method may further include the step of establishing (via the third transceiver device) a fourth communication link with a fourth transceiver device located in proximity to the third transceiver device; and connecting (via the controller) the first, third, and fourth communication links such that communications can occur between the first and fourth transceiver devices. In these embodiments, the method may further include the step of additionally basing (via the controller) the indicator information on the fourth communication link.

A non-transitory and machine-readable medium having stored thereon executable instructions adapted to indicate the presence of one or more vehicle passengers during wireless communications is presented herein. Furthermore, when the non-transitory and machine-readable medium is provided to a controller and executed thereby, causes the controller to: receive vehicle passenger information from one or more vehicle sensors located within a vehicle interior; permit a first communication link to be established with a first transceiver device; and permit a second communication link to be established with one or more second transceiver devices located in proximity to the vehicle interior; receive general identifier information from the one or more second transceiver devices; generate user information based on the general identifier; generate indicator information based on the vehicle passenger information and user information; and provide the first transceiver device with the indicator information through the first communication link.

In one or more embodiments, the non-transitory and machine-readable memory further causes the controller to: receive a command to launch the first communication link with the first transceiver device; and launch the first communication link with the first transceiver device. In one or more embodiments, the non-transitory and machine-readable memory further causes the controller to: permit a third communication link to be established with the third transceiver device located in proximity to the vehicle interior; and permit a connection to be configured between the first and third communication links such that communications can occur between the first and third transceiver devices. In these embodiments, the non-transitory and machine-readable memory further causes the controller to additionally base the indicator information on the third communication link. In these embodiments, the non-transitory and machine-readable memory further causes the controller to: permit a fourth communication link to be established between a fourth transceiver device and the third transceiver device (the fourth transceiver device being located in proximity to the third transceiver device); and permit a connection to be configured between the first, third, and fourth communication links such that communications can occur between the first and fourth transceiver devices. In one or more embodiments, the non-transitory and machine-readable memory further causes the controller to additionally base the indicator information on the fourth communication link.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
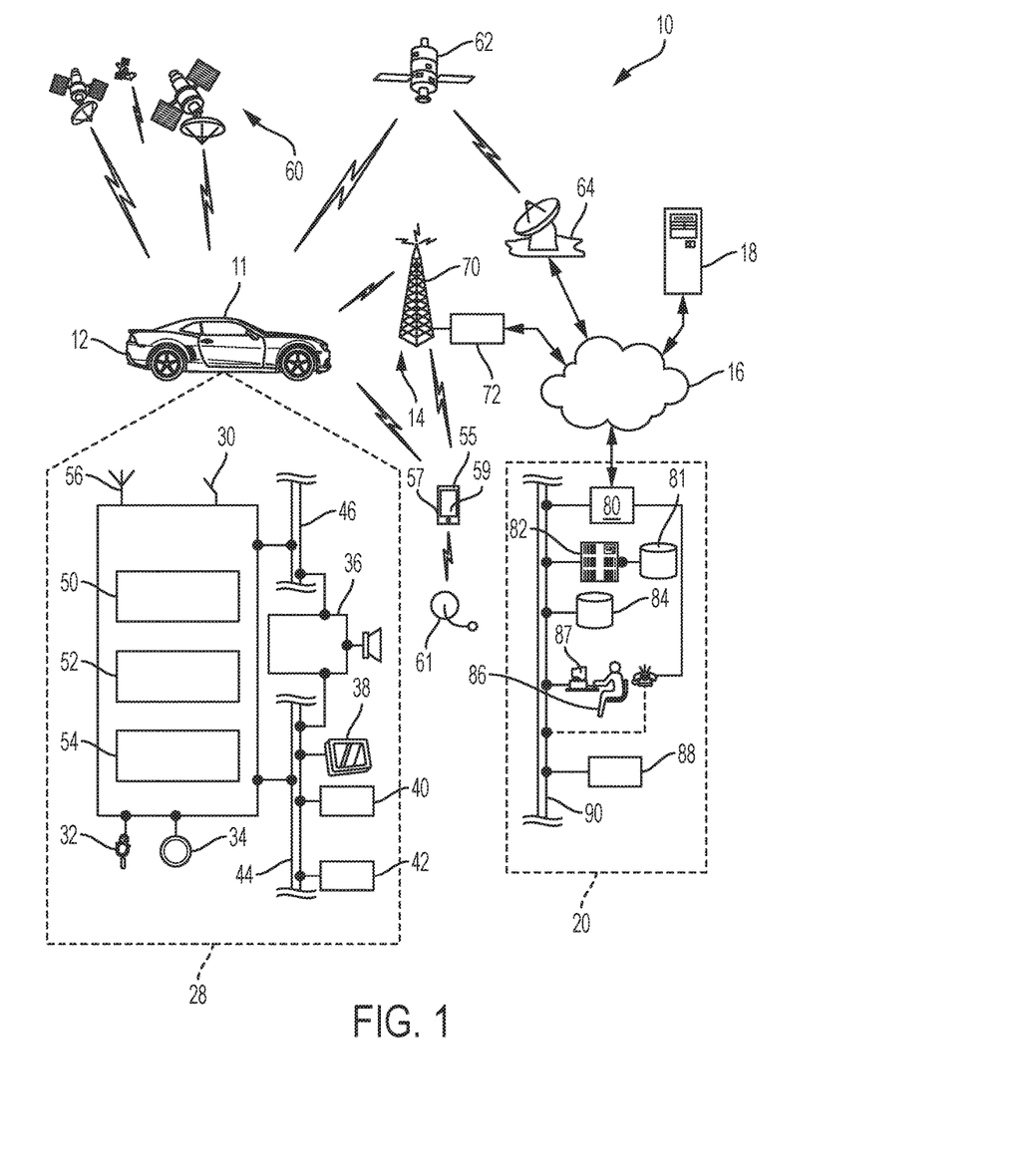
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52 (i.e., a controller), at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth.

Figure 5:
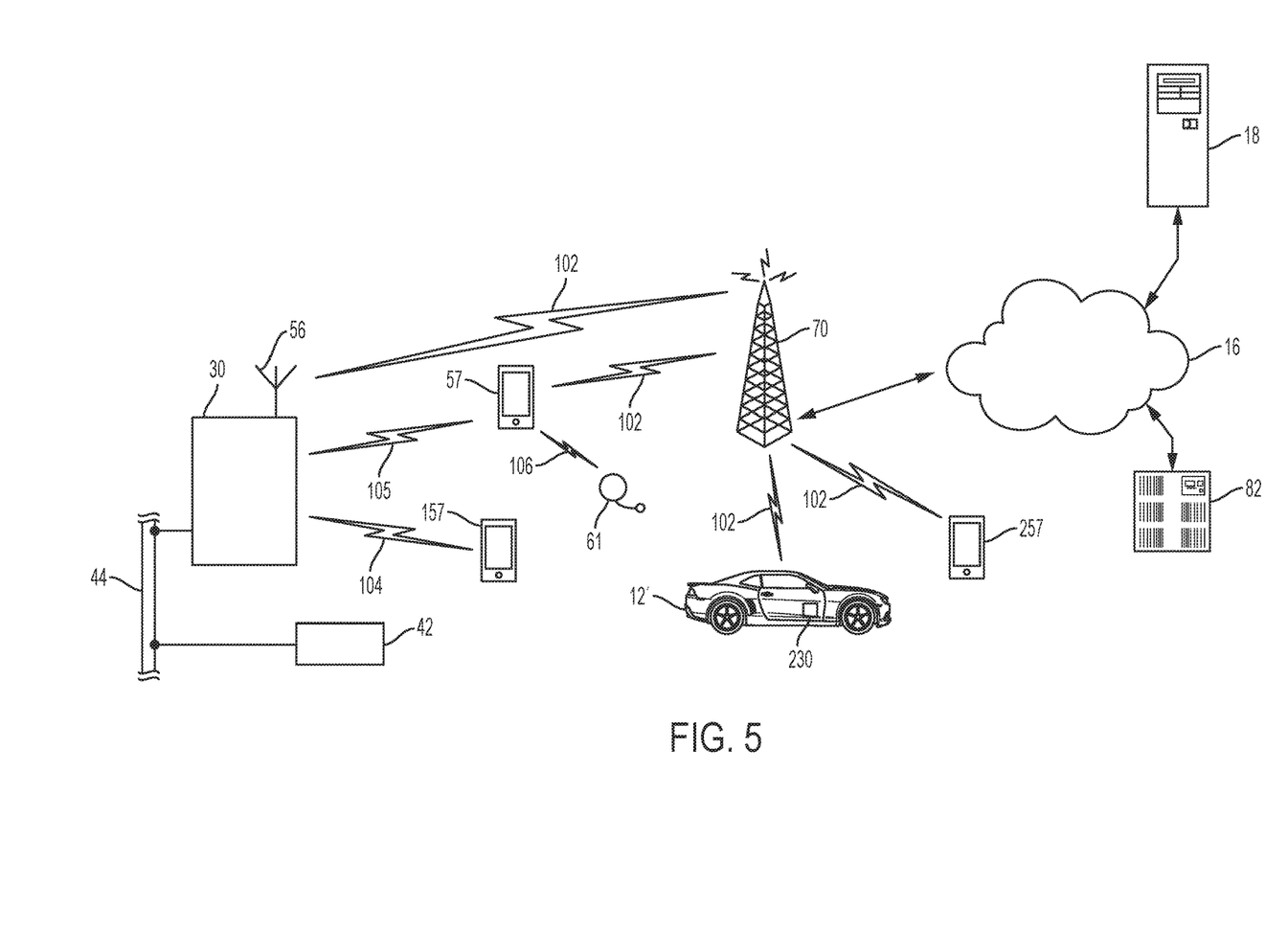
FIG. 5 is a block diagram depicting one or more exemplary aspects of the method presented herein.

One of the networked devices that can communicate with the telematics unit 30 is a mobile computing device 57 (which goes the same for the secondary mobile computing device 157 and the recipient mobile computing device 257, as shown in FIG. 5). Mobile computing device 57 may be, but is not limited to, a smart phone, personal laptop computer, smart wearable device, or tablet computer having two-way communication capabilities, a netbook computer, or any suitable combinations thereof. Each mobile computing device 57 can include computer processing capability (i.e., a controller), a transceiver capable of communicating with wireless carrier system 14, a user interface 59 with visual display, and/or a GPS module capable of receiving GPS satellite signals and generating GPS coordinates based on those signals. User interface 59 may be embodied as a touch-screen graphical interface capable of user interaction as well as displaying information. Examples of mobile computing device 57 include the iPhone™ manufactured by Apple, Inc. and the Droid™ manufactured by Motorola, Inc. as well as others. While mobile computing device 57 may include the ability to communicate via a long-range communication link 102 (e.g., cellular communications) using the wireless carrier system 14, this is not always the case. For instance, Apple manufactures devices such as the various models of the iPad™ and iPod Touch™ that include the processing capability, interface 59, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile computing device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless communication link (SRWC) protocol (e.g., Bluetooth/Bluetooth Low Energy or Wi-Fi), mobile computing device 57 and telematics unit 30 may pair/link one with another when within a wireless range. In order to pair, mobile computing device 57 and telematics unit 30 may act in a BEACON or DISCOVERABLE MODE having a general identification (ID); SRWC pairing is known to skilled artisans. The general identifier (ID) may include, e.g., the device's name, user name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion.

A wireless device that can communicate directly with mobile computing device 57 is a wireless communication device 61, such as a wireless headset. Communication device 61 can incorporate a single-earpiece or double-earpiece and a microphone to provide the equivalent functionality of a telephonic handset but with hands-free operation. As is generally known, an independent SRWC protocol may also be established between mobile computing device 57 and wireless communication device 61 to allow for such hands-free operation.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Apart from the audio system 36 and GPS module 40, the vehicle 12 can include other VSMs 42 in the form of electronic hardware components that are located throughout the vehicle (e.g., vehicle interior) and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various components located throughout the vehicle and provide vehicle body data with respect to the componentry of the vehicle body and interior. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. According to another embodiment, the BCM is equipped with vehicle interior diagnostic (VID) features that provide myriad real-time data such as vehicle passenger information based on data received from various seat and seatbelt sensors (for example, but not limited to, pressure/heat sensors embedded at various locations of the seat cushions and mechanical sensors in the seatbelt pulley system). As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72 connected to cell towers 70, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example digital technologies such as, but not limited to, 4G LTE and 5G. As will be appreciated by skilled artisans, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers having a processor (i.e., controller) and memory and being accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where communications-base information (e.g., indicator information), diagnostic information (e.g., vehicle passenger information, status icon information), and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. Computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 (i.e., a controller) which essentially controls the operations of server 82. Server 82 may control data information as well as act as a transceiver to send and/or receive the data information (i.e., data transmissions) from one or more of the data bases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

In general, being founded on the communication system of FIG. 1, the present system and method is directed to providing vehicle operators and/or mobile device operators engaged in two-way wireless voice communications with the ability to determine the presence of any vehicle passengers nearby the opposing party to such communications. This system and method consequently informs one or both parties of the privacy status of any conversations made during such voice communications. In essence, the system and method reduces the risk of one or both parties inadvertently making a potentially embarrassing/personal/confidential statement that could be overheard by any vehicle passengers.

Figure 2:
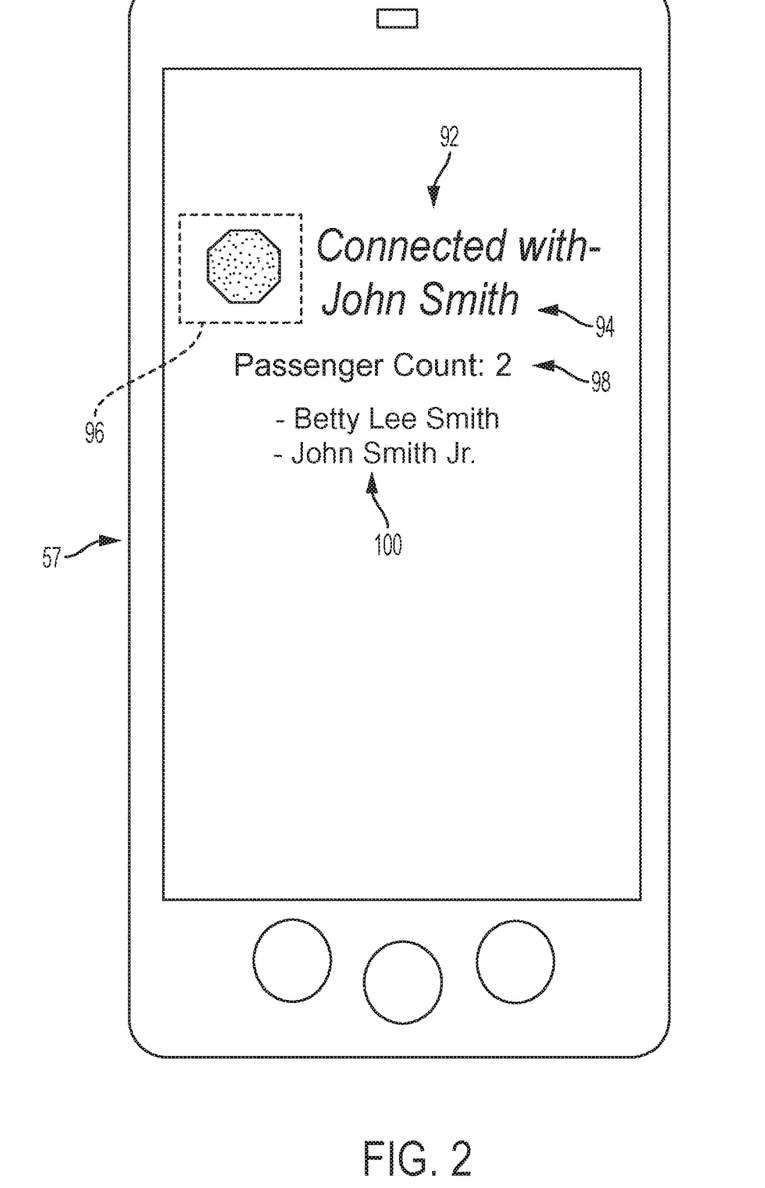
FIG. 2 is an exemplary application of one or more aspects of the system and method presented herein.
Figure 3:
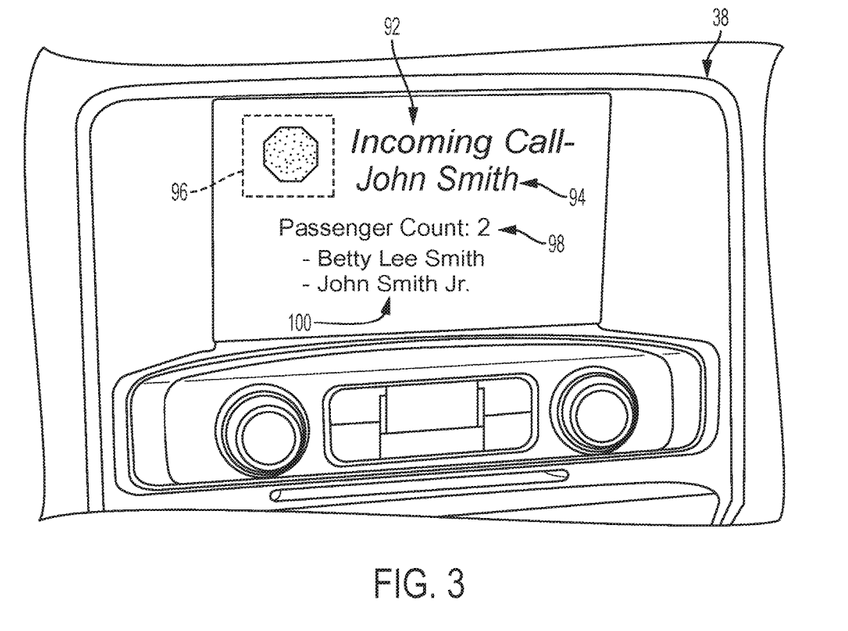
FIG. 3 is another exemplary application of one or more aspects of the system and method presented herein.

Referring to FIGS. 2 and 3, while using a two-way wireless voice communications client device (i.e., telematics unit 30, mobile computing device 57), the user is given the ability to interact with other users, for example, by launching a long-range communication link via wireless carrier system 14 (shown in FIG. 5). In addition to enabling a user to perform two-way wireless voice communications, the client device may also allow for other communication functions (e.g., sending messages and/or items to another user, accessing web sites). The communication link may, for example, be implemented using a client-server model in which communications from one device to the other are relayed and enhanced through computer 18 or server 82 via land communications network 16. The link may otherwise, for example, use a peer-to-peer network model in which both client devices communicate with each other directly via wireless carrier system 14 in a decentralized manner.

Upon one of the parties to a conversation initiating two-way (bi-directional) wireless voice communications, a display 38/59 on their computing device 30/57 may exhibit the connection status icon 92, primary opposing party name 94, passenger status indication icon 96, passenger count icon 98, and any vehicle passenger names 100. This information is moreover dynamic and apt to changing at any point during the two-way wireless communications. For example, if any one of the passengers enters/exits a vehicle involved in these communications, the passenger count may change to reflect the new number of passengers. It should be understood that only one party involved in the two-way wireless communication may be using a vehicle. It should be understood that any of these icons may be embodied as audio information or supported by audio information, from audio system 36.

Passenger status indication icon 96 and passenger count icon 98 can be dependent on sensor information generated from sensors of the vehicle interior. As such, sensors embedded in the seats or seatbelt systems of one vehicle will produce vehicle passenger information and pass that information to the vehicle's telematics unit 30. Telematics unit 30 can then generate indicator information from this sensor information or it can act as a relay device and pass the vehicle passenger information to a remote computing device (e.g., computer 18, data center server 82) or mobile computing device 57 so as to generate the indicator information. The generated indicator information can then be passed to one or more other vehicles/parties involved in this communications process through the established long-range communication link. To illustrate, if pressure is applied to one or more sensors of a vehicle seat and/or if the seatbelt is deployed, these sensors may collaborate to generate a binary signal stating a passenger is sitting in a particular seat. It is this signal that is thus passed along to the vehicle's telematics unit 30. Each sent signal can moreover be compiled by the telematics unit 30, mobile computing device 57, or remote computing device 18/82 to produce a number for the passenger count 98.

Passenger name information 100 can be dependent on the secondary mobile computing devices 157 of each vehicle passenger. As such, before or during the initiation of the two-way wireless communications, an SRWC (e.g., WI-FI) may independently be established within the vehicle interior. As a result, each secondary mobile computing device 157 within the vehicle interior may in turn communicate with telematics unit 30 or primary mobile computing device 57 and push its general identifier (ID). From this, telematics unit 30 can derive the user name for each secondary mobile computing device 157 or telematics unit 30/primary mobile computing device 57 can relay the general identifier (ID) or contact name directly to a remote computing device 18/82 for user name derivations. In addition, to initiate the two-way wireless communications, telematics unit 30 may communicate with primary mobile computing device 57, of the vehicle operator, via the SRWC within the vehicle—as is generally known in the art. This allows a connection to be configured between primary mobile computing device 57 and the recipient telematics unit 230 and/or mobile computing device 257, by using primary mobile computing device 57 as a transceiver. This connection moreover allows the general identifier (ID) of primary mobile device 57 to be provided to the local telematics unit 30 or remote server 18/82 to, for example, derive the primary opposing party name 94. Skilled artists will also see telematics unit 30 may otherwise be programmed to pull the general identifier (ID) from mobile computing device 57.

In certain instances, as discussed above, an independent and distinct SRWC may be established between primary mobile device 57 and wireless communication device 61. This allows a connection to be configured to ultimately go between the operator's wireless communication device 61 and the other party's telematics unit 30 and/or mobile computing device 57. As follows, the operator may provide voice communications to the other party via wireless communication device 61. An independent wireless device signal may also be provided to the local telematics unit 30 or remote server 18/82 to, for example, indicate whether wireless communication device 61 is in use.

Figure 4:
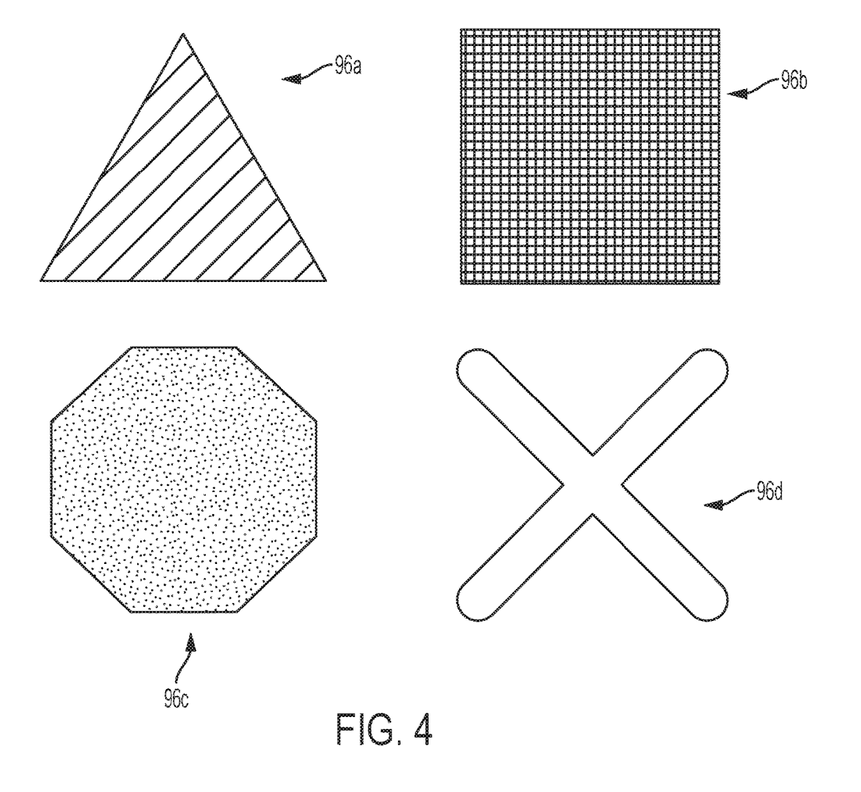
FIG. 4 discloses multiple exemplary status icons according to an aspect of the system and method presented herein.

As shown in FIG. 4, the status indicator icon 96 can be based on various factors of the two-way wireless communications. For example, when a primary party in the other vehicle is alone during the wireless communications, status indicator icon 96 may be displayed as a green triangle. For this indication to occur, the vehicle interior sensors will produce and provide vehicle passenger information reflecting that none of the passenger seats are currently being used. When the primary party in the other vehicle has one or more passengers accompanying them within the vehicle and that party is communicating through their wireless communication device 61, status indicator icon 96 may be displayed as a yellow square. For this indication to occur, the vehicle interior sensors will produce and provide vehicle passenger information reflecting that at least one of the passenger seats is being used. Moreover, wireless communication device 61 will produce and provide a wireless device signal which is being received and recognized at telematics unit 30, mobile computing device 57, or remote server 18/82 of the other party's vehicle (before being sent to the recipient telematics unit 230/mobile computing device 257). When the primary party in the other vehicle has one or more passengers accompanying them within their vehicle and they are not using wireless communication device 61, status indicator icon 96 may be displayed as a red octagon. For this indication to occur, the vehicle interior sensors will produce and provide vehicle passenger information reflecting that at least one of the passenger seats is being used. Moreover, telematics unit 30, mobile computing device 57, or remote server 18/82 of the other party's vehicle will recognize that no wireless device signal is being received.

When the primary party is not within the vehicle interior, status indicator icon 96 may be displayed as a gray "X" shape. For this indication to occur, the indication information signal will indicate that the other party is communicating via their mobile device 57 and that no supplemental vehicle passenger or SRWC information is being provided. Otherwise, the opposing party's telematics unit 30 or remote server 18/82 will receive an affirmative signal indicating that mobile device 57 is in direct communication. It should be understood that one or more other shapes and/or colors may be used for indication purposes of status indicator icon 96. It should be further understood that logos may be used for indication purposes of status indicator icon 96. It should be further yet understood that the vehicle passenger information may indicate which seats within the other party's vehicle interior are currently being used. It should be even further yet understood, as explained above, these icons may be embodied as audio information or supported by audio information, from audio system 36.

Figure 6:
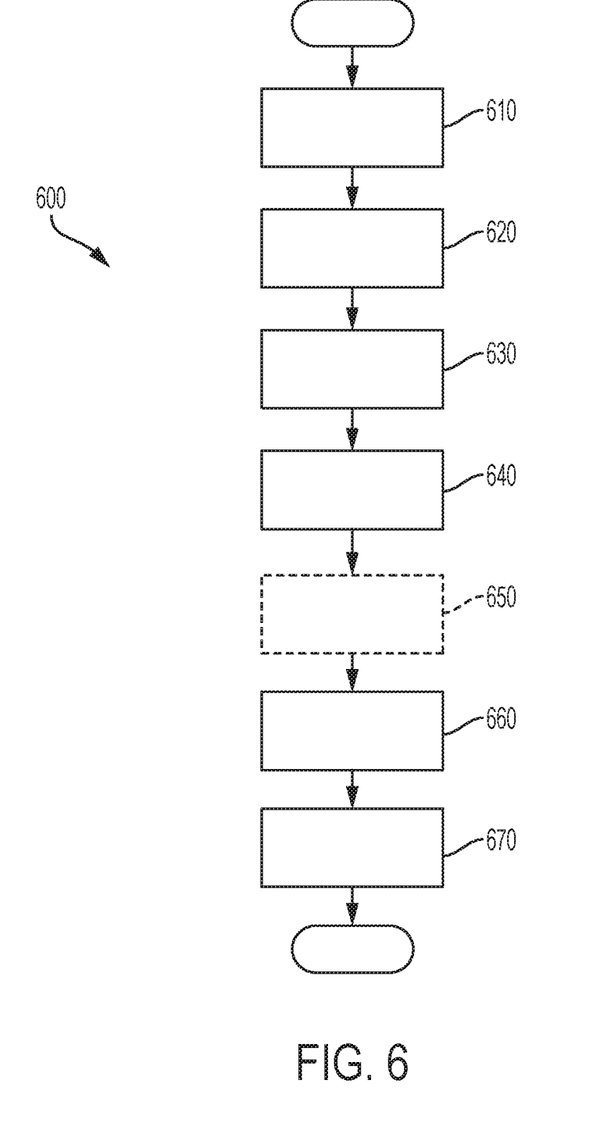
FIG. 6 is a schematic flow chart representation one or more aspects of the method presented herein.

An exemplary method of indicating the presence of one or more vehicle passengers during wireless communications is shown in FIGS. 5 and 6. Aspects of this method can be executed through the mobile computing device 57 of a party initiating two-way wireless voice communications, for example, to use the mobile computing device 57 as a two-way wireless voice communications client device which substantially carries out each step of method 500 (which may be via a peer-to-peer network model). Aspects of this method can also be executed through the telematics unit 30 of a party initiating two-way wireless voice communications, for example, to use the telematics unit 30 as the two-way wireless voice communications client device which carries out each step of method 500 (which may be via a peer-to-peer network model). Aspects of this method can alternatively be executed through computer 18 or server 82, for example, to enhance and relay two-way wireless voice communications between a telematics unit 30 and one or more recipient transceiver devices (e.g., telematics units, mobile computing devices, etc.) which substantially carries out each step of method 500 (i.e., via a client-server network model). Peripheral aspects may additionally be executed through a recipient mobile computing device 257 and/or recipient telematics unit 230 (for example, to receive two-way wireless voice communications enhanced with indicator information) and/or wireless communication device 61.

Method 600 is supported by communication system 10. The method 600 is moreover supported by primary mobile computing device 57 being configured to receive a command to launch a long-range communication link 102 received by a recipient transceiver device (e.g., an opposing telematics unit 230, mobile computing device 257, etc.) as well as being further configured to launch this communication link 102. The method 600 is also supported by telematics unit 30 being configured to receive a command to launch and in turn launch long-range communication link 102 to be received by recipient transceiver device 257/230. The method 600 is further yet supported by telematics unit 30 being configured to establish a vehicle interior SWRC 102 with one or more transceiving devices (e.g., primary mobile computing device 57, secondary mobile computing device 157, etc.). Such configurations may be made by a vehicle manufacturer at or near the time of the telematics unit's assembly or after-market (e.g., via vehicle download using the afore-described communication system 10 or at a time of vehicle service, just to name a couple of examples). The method 600 is even further yet supported by primary mobile computing device 57 being configured to establish SRWC 102 with telematics unit 30 as well as being configured to optionally establish an independent and distinct secondary SWRC 106 with one or more ancillary transceiving devices (e.g., wireless communication device 61).

The method begins with step 610, in which mobile computing device 57 or telematics unit 30 establishes long-range two-way wireless voice communications 102 with the recipient transceiver device 257/230. As such, the vehicle operator wishing to communicate with one or more opposing party's will command mobile computing device 57 or telematics unit 30 to launch communication link 102 and mobile device 57/telematics unit 30 will in turn launch communication link 102. Communication link 102 may likewise be sent directly to the recipient transceiver device 257/230 (i.e., peer-to-peer network model) or relayed and enhanced through computer 18 or server 82 (i.e., via a client-server network model). During step 610, moreover, the communication link 102 is established with the remotely located recipient transceiver device 257/230 and thus the long-range connection is permitted.

In step 620, telematics unit 30 establishes SRWC 104 with one or more secondary mobile computing devices 157 (second transceiver devices) within the vehicle interior. In step 630, at some point prior to or during the long-range, two-way wireless voice communications, telematics unit 30 will receive vehicle passenger information (information of any bystanders) from one or more vehicles sensors 42 which may be within the vehicle's interior. What is more, at some point prior to or during the long-range two-way wireless voice communications, telematics unit 30 will receive general identifier (ID) information from at least one of the secondary mobile computing devices 157 which can be within the interior of the vehicle (step 640). In some instances, at some point prior to or during the long-range, two-way wireless voice communications, in optional step 650, telematics unit 30 will receive status information regarding an SRWC communication link 105 established with primary mobile computing devices 57 as well as status information regarding an independent SRWC communication link 106 established between primary mobile computing device 57 and a wireless communication device 61 (i.e., an ancillary transceiving device in proximity to the mobile computing devices 57).

Depending on the network model, in step 660, either primary mobile computing device 57, telematics unit 30, or a remote computing device (computer 18 or server 82) will generate indicator information. For example, in a peer-to-peer network model, mobile computing device 57 or telematics unit 30 will generate the indicator information based on the received vehicle passenger information (step 530) and received general identifier (ID) information (step 540). In another example, in a client-server network model, mobile computing device 57 or telematics unit 30 will receive the vehicle passenger information and general identifier (ID) information and in turn pass that information to the remote computing device 18/82, which will consequently generate the indicator information. In certain instances, the indicator information may be further based on the received status of SRWC communication link 105, between telematics unit 30 and primary mobile computing devices 57, and/or the received status information regarding an SRWC communication link 106, established between primary mobile computing device 57 and wireless communication device 61. Lastly, in step 670, either primary mobile computing device 57, telematics unit 30, or remote computing device 18/82 will provide the generated indicator information via the established long-range communication link 102. As such, the indicator information will be formatted to be received by the remote transceiver device 230/257.

Depending on the received information, as explained above, the generated indicator information can correspond to a particular passenger status indication icon 96. Therefore, for instance, when the passenger information reflects there are no vehicle passengers (i.e., bystanders), the indicator information may correspond to a status icon 96 embodied as a green triangle. In another instance, when the passenger information reflects there is at least one vehicle passenger as well as SRWC communication link 106 between the primary mobile computing devices 57 and a wireless communication device 61 is determined as established, the indicator information may correspond to a status icon 96 embodied as a yellow square. In a third instance, when the passenger information reflects there is at least one vehicle passenger but no SRWC communication link 106 between the primary mobile computing device 57 and a wireless communication device 61 exists, the indicator information may correspond to a status icon 96 embodied as a red octagon. As explained above, these icons may be embodied as audio information or supported by audio information.

The generated indicator information can also correspond to a particular dynamic passenger count icon 98. Therefore, for instance, when the passenger information reflects there are two passengers currently sitting in the vehicle interior, the indicator information may correspond to a dynamic passenger count icon 98 embodied as the number two (2). The generated indicator information can also correspond to the displayed vehicle passenger names 100. Therefore, for instance, from the general identifier (ID) information received from each secondary mobile computing device 157, the names of the owners of the secondary mobile device 157 can be derived and formatted to be displayed. Similarly, the generated indicator information can also correspond to the primary opposing party name 94 information and connection status icon 92. Therefore, for instance, from the general identifier (ID) information received from the primary mobile computing device 57, the name to the owner of this mobile device can be derived and formatted for display as the opposing party name 94. The status of the connection with the primary mobile computing device 57 can moreover be derived and formatted for display as the connection status icon 92.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. In a communication system capable of wireless communications between a primary mobile computing device, secondary mobile computing device, recipient mobile computing device, vehicle telematics unit, recipient vehicle telematics unit, and one or more remote computing devices, wherein the primary mobile computing device, secondary mobile computing device, and recipient mobile computing device are a smart phone, personal laptop computer, or tablet computer, a method to indicate the presence of one or more vehicle passengers during wireless communications through one or more exhibited dynamic status indicator icons, the method comprising:

receiving, via the vehicle telematics unit, vehicle passenger information from one or more vehicle sensors located within a vehicle interior;

permitting, via the vehicle telematics unit or primary mobile computing device, a first communication link to be established with the recipient mobile computing device or recipient vehicle telematics unit;

permitting, via the vehicle telematics unit, a second communication link to be established with one or more secondary mobile computing devices located in proximity to the vehicle interior;

receiving, via the vehicle telematics unit, general identifier information from the one or more secondary mobile computing devices;

generating, via the vehicle telematics unit or remote computing device, user information based on the general identifier information;

generating, via the vehicle telematics unit or remote computing device, indicator information based on the vehicle passenger information and user information, the indicator information configured to be exhibited on a display as the one or more dynamic status indicator icons to indicate the presence status of one or more vehicle passengers, the one or more dynamic status indicator icons being apt to change based on the vehicle passenger information and user information; and providing, via the vehicle telematics unit or remote computing device, the recipient mobile computing device or recipient vehicle telematics unit with the indicator information through the first communication link.

2. The method of claim 1, further comprising:
receiving, via the vehicle telematics unit or primary mobile computing device, a command to launch the first communication link with the recipient mobile computing device or recipient vehicle telematics unit; and launching, via the vehicle telematics unit or primary mobile computing device, the first communication link with the recipient mobile computing device or recipient vehicle telematics unit.

3. The method of claim 1, further comprising:
permitting, via the vehicle telematics unit, a third communication link to be established with the primary mobile computing device located in proximity to the vehicle interior;

permitting, via the vehicle telematics unit, a connection to be configured between the first and third communication links such that communications can occur between the primary mobile computing device and recipient mobile computing device or recipient vehicle telematics unit.

4. The method of claim 3, further comprising additionally basing, via the vehicle telematics unit or remote computing device, the indicator information on the third communication link.

5. The method of claim 3, further comprising:
establishing, via the primary mobile computing device, a fourth communication link with a wireless headset located in proximity to the primary mobile computing device; and permitting, via the vehicle telematics unit, a connection to be configured between the first, third, and fourth communication links such that communications can occur between the wireless headset and recipient mobile computing device or recipient vehicle telematics unit.

6. The method of claim 5, further comprising additionally basing, via the vehicle telematics unit or remote computing device, the indicator information on the fourth communication link.

7. A non-transitory and machine-readable medium having stored thereon executable instructions adapted to indicate the presence of one or more vehicle passengers during wireless communications through one or more exhibited dynamic status indicator icons, the non-transitory and machine-readable medium being in a communication system capable of wireless communications between a primary mobile computing device, secondary mobile computing device, recipient mobile computing device, vehicle telematics unit, recipient vehicle telematics unit, and one or more remote computing devices, wherein the primary mobile computing device, secondary mobile computing device, and recipient mobile computing device are a smart phone, personal laptop computer, or tablet computer, which when the non-transitory and machine readable medium is provided to a vehicle telematics unit and executed thereby, causes the vehicle telematics unit to:

receive vehicle passenger information from one or more vehicle sensors located within a vehicle interior;

permit a first communication link to be established with the recipient mobile computing device or recipient vehicle telematics unit; and     permit a second communication link to be established with one or more secondary mobile computing devices located in proximity to the vehicle interior;

receive general identifier information from the one or more secondary mobile computing devices;

generate user information based on the general identifier information;

generate indicator information based on the vehicle passenger information and user information, the indicator information configured to be exhibited on a display as the one or more dynamic status indicator icons to indicate the presence status of one or more vehicle passengers, the one or more dynamic status indicator icons being apt to change based on the vehicle passenger information and user information; and     provide the recipient mobile computing device or recipient vehicle telematics unit with the indicator information through the first communication link.

8. The non-transitory and machine-readable memory of claim 7, which further causes the vehicle telematics unit to:

receive a command to launch the first communication link with the recipient mobile computing device or recipient vehicle telematics unit; and     launch the first communication link with the recipient mobile computing device or recipient vehicle telematics unit.

9. The non-transitory and machine-readable memory of claim 7, which further causes the vehicle telematics unit to:

permit a third communication link to be established with the primary mobile computing device located in proximity to the vehicle interior; and     permit a connection to be configured between the first and third communication links such that communications can occur between the primary mobile computing device and recipient mobile computing device or recipient vehicle telematics unit.

10. The non-transitory and machine-readable memory of claim 9, which further causes the vehicle telematics unit to additionally base the indicator information on the third communication link.

11. The non-transitory and machine-readable memory of claim 9, which further causes the vehicle telematics unit to:

permit a fourth communication link to be established between a wireless headset and the primary mobile computing device, the wireless headset located in proximity to the primary mobile computing device; and     permit a connection to be configured between the first, third, and fourth communication links such that communications can occur between the wireless headset and recipient mobile computing device or recipient vehicle telematics unit.

12. The non-transitory and machine-readable memory of claim 11, which further causes the vehicle telematics unit to additionally base the indicator information on the fourth communication link.

\* \* \* \* \*